United States Patent [19]
Witzel

[11] 4,359,854
[45] Nov. 23, 1982

[54] TRACTOR DRAWN HARVESTING COMBINE

[75] Inventor: Homer D. Witzel, Englewood, Fla.

[73] Assignee: Chamberlain John Deere Pty. Ltd., Welshpool, Australia

[21] Appl. No.: 225,016

[22] Filed: Jan. 14, 1981

[51] Int. Cl.³ .............................................. A01B 73/00
[52] U.S. Cl. ........................................ 56/228; 56/14.9
[58] Field of Search ............... 56/228, 218, 14.9, 15.5, 56/15.1, 15.2; 280/638, 656

[56] References Cited

U.S. PATENT DOCUMENTS

| | | | |
|---|---|---|---|
| 1,706,617 | 3/1929 | Krause | 56/228 |
| 1,832,033 | 11/1931 | Lassagne | 56/14.9 |
| 2,850,863 | 9/1958 | Pierson | 56/228 |
| 3,683,605 | 4/1972 | Jakobi | 56/228 |
| 4,058,958 | 11/1977 | Sadler et al. | 56/228 |

*Primary Examiner*—Paul J. Hirsch
*Attorney, Agent, or Firm*—Harness, Dickey & Pierce

[57] ABSTRACT

A harvesting combine having a crop gathering means supported by a first wheeled chassis, a crop treatment means supported by a second wheeled chassis, and a drawbar on said crop treatment means for connection to a tractor vehicle. The crop gathering means being pivotally supported on the first wheeled chassis for rotation about a substantially vertical axis between a first position lying transversly across the first wheeled chassis and a second position lying longitudinally thereon. The first wheeled chassis being pivotally mounted to the second wheeled chassis to be movable from a first position beside the crop treatment means to a second position trailing behind the crop treatment means, wherein when the first wheeled chassis is in its first position and the crop gathering means is in its first position on the first wheeled chassis the crop gathering means extends transversly in front of the crop treatment means and the outlet of the crop gathering means is in communication with the inlet of the crop treatment means, and when the first wheeled chassis is in its second position and the crop gathering means is in its second position both the first wheeled chassis and the crop gathering means are located behind the crop treatment means.

16 Claims, 6 Drawing Figures

TRACTOR DRAWN HARVESTING COMBINE

This invention relates to a harvesting combine and in particular the mounting of the crop gathering means to the crop treatment means.

Harvesting combines currently use comprise a chassis which supports both the crop treatment machinery and the crop gathering means which are mounted in fixed relation to each other. In the case of tractor drawn combines the crop gathering means is required to extend to one side of the chassis. As a result, the width of cut of such combines is limited since the desire to optimise the width of cut of the combine is limited by the necessity to transport the combine which can involve movement through narrow gates, roads or tracks. In addition, the length of the cutting platform is limited by the structural loading on the chassis of the combine as a result of the cantilever mounting of the platform to the chassis. Such cantilever mounting also results in large vertical movements of the free end of the cutting platform as a result of the combine moving over undulations in the ground.

In some instances, it has been proposed to utilise a crop gathering means which is separable from the chassis when it is desired to transport the combine in order that it may be able to negotiate narrow gates, roads and tracks. However, such crop gathering means when in use are mounted to the combine chassis and extend in cantilever relationship to one side thereof with all the inherant problems of such a mounting. In addition, it also becomes necessary to store the platform when removed from the chassis.

It is an object of this invention to provide a crop gathering means of a harvesting combine which is not dependant for its support upon the structure of the crop treatment means of the combine.

In one form the invention resides in a harvesting combine comprising a crop gathering means supported by a first chassis and a crop treatment means supported by a second wheeled chassis crop treatment means having a draw bar for connection to a tractor vehicle. The crop gathering means is pivotally supported on the first wheeled chassis for rotation about a substantially vertical axis between a first position lying transversely across the first wheeled chassis and a second position lying longitudinally thereon. The first wheeled chassis is pivotally mounted to the second wheeled chassis to be movable from a first position beside the crop treatment means to second position trailing behind the crop treatment means. When the first wheeled chassis is in its first position and the crop gathering means is located in its first position on the first wheeled chassis the crop gathering means extends transversely in front of the crop treatment means and the outlet of the crop gathering means is in communication with the input of the crop treatment means. When the first wheeled chassis is in its second position and the crop gathering means is in its second position thereon both the first wheeled chassis and the crop gathering means are located behind the crop treatment means.

The invention will be more fully understood in the light of the following description of two specific embodiments. The description is made with reference to the accompanying drawings of which.

Figure 1:
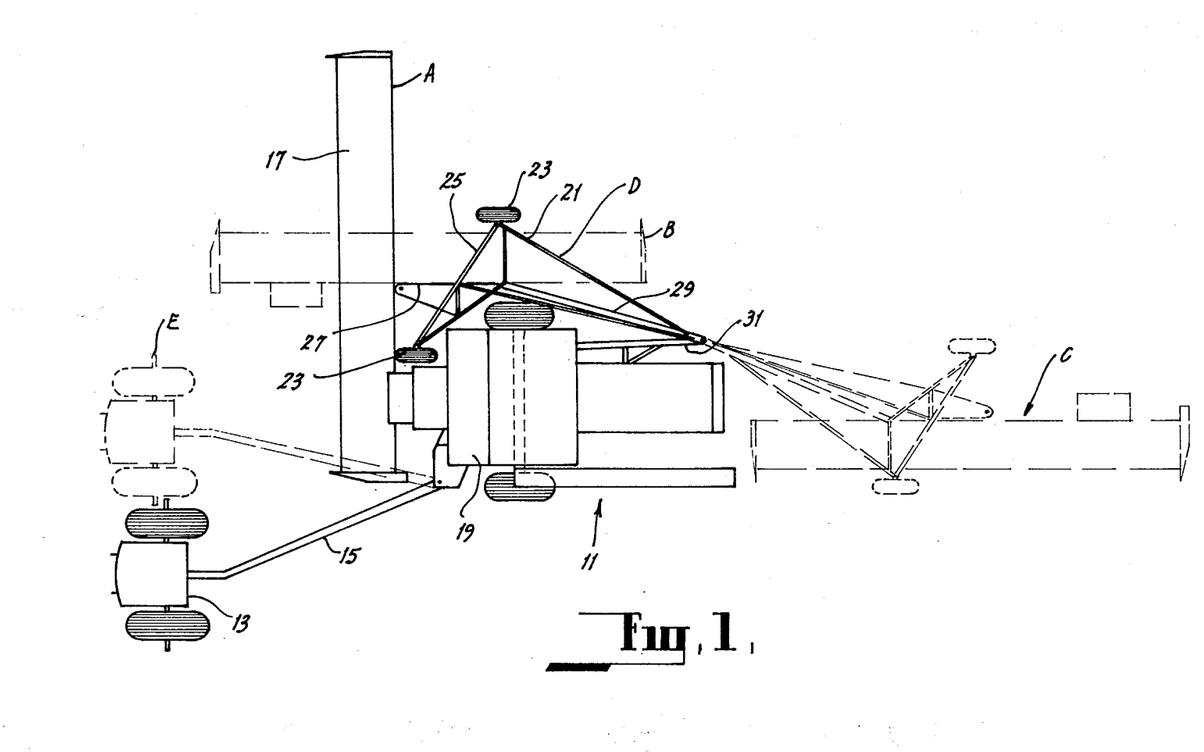
FIG. 1 is a top plan view of a harvesting combine according to the first embodiment.

The first embodiment is directed to a harvesting combine 11 which is to be trailed behind a tractor vehicle 13 via an articulated draw bar 15. The combine comprises a crop collecting means 17 and a crop treatment means 19. The crop collecting means 17 is supported by a first wheeled chassis 21 and is pivotally supported towards its centre about a substantially vertical axis whereby the crop gathering means 17 can be pivoted from a position lying transversely on the first wheeled chassis (as shown at A in solid lines) to a position lying longitudinally on the first wheeled chassis (as shown at B in broken lines).

The first wheeled chassis 21 comprises a pair of wheels 23 mounted in spaced relation to each other and having a truss frame 25 interconnecting them. The truss frame also supports the crop gathering means 17 via a support structure 27 which comprises essentially a parallelogram linkage incorporating a lift means in the form of a hydraulic cylinder, whereby the crop gathering means may be transposed vertically in order to adjust the height of the crop gathering means when in the crop gathering mode (as shown at A) and also to raise the crop gathering means 17 prior its transposition from its transverse position A to longitudinal position B on the first wheeled chassis 21 in order that the crop gathering means will not strike the outermost wheel 23 of the first wheeled chassis 21 during such transposition. The first wheeled chassis 21 further incorporates a rearwardly extending frame structure 29 which at its rearmost end is pivotally connected to a rearwardly extending frame 31 of the wheeled chassis of the crop treatment means 19. The function of the rearwardly extending frame structure 29 of the first wheeled chassis and the rearwardly extending frame 31 of the wheeled chassis of the crop treatment means is to apply an upwardly directed counter-moment to the rear of the crop treatment means as a result of the load of the crop gathering means to the front of the first chassis 21 to overcome the absence of the conventional crop gathering means usually supported at the front of the crop treatment means. As a result of the pivotal interconnection between the first wheeled chassis 21 and the wheeled chassis of the crop gathering means 19 the first wheeled chassis is movable between a position trailing behind the crop treatment means 19 (as shown at C in broken lines) to a position lying beside the crop treatment means (as shown at D in solid lines). When the first wheeled chassis 21 is in the trailing position C the tractor is positioned directly in front of the combine (as shown at E in broken lines) and when the first chassis lies beside the crop treatment means as shown at D the tractor is located in front of the combine but to the opposite side of the crop treatment means from the first wheeled chassis 21 (as shown in solid lines). Therefore when in the trailing mode C the tractor-combine combination occupies a much reduced width than the combine when in the crop gathering mode and both the crop treatment and the first wheeled chassis 21 will track behind the tractor vehicle 13 to enable it to negotiate bends and corners with ease. To move between the trailing position C and the operative position D involves a very simple manipulation of the two wheeled chassis by the tractor.

Figure 2:
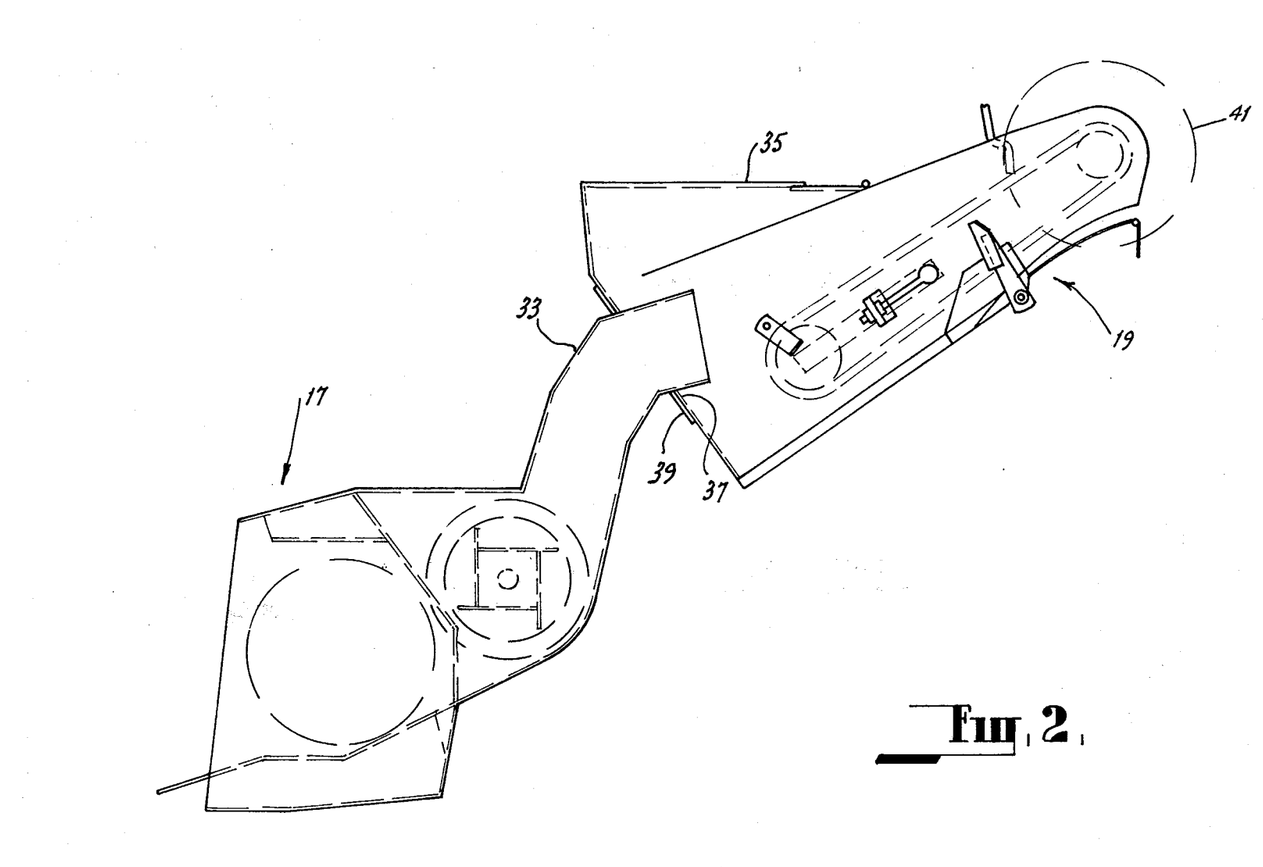
FIG. 2 is a part-sectional elevation showing the interconnection between the crop gathering means and the crop treatment means of the combine of both embodiments when the crop gathering means is in the crop gathering mode.

When the wheeled chassis 21 is in the operative position D and the crop gathering means 17 is in the crop gathering mode A the output chute 33 of the crop gathering means 17 becomes engaged in the input chute 35 of the crop treatment means 19 through an opening 37 provided in the input chute 35 which has around its periphery a resiliently flexible seal 39 to ensure a substantially fluid tight connection between the respective chutes (FIG. 2). The input chute 35 of the crop treatment means 19 is pivotally mounted at its rear end to the main structure of the crop treatment means such that as the crop gathering means 17 is transposed vertically to accommodate for variations in collecting height so the input chute 35 will move accordingly. In addition then the crop gathering means is raised prior to its transposition to its longitudinal position B on the first wheeled chassis 21, the input chute 35 will move accordingly and at the upper limits of the movement the output chute 33 of the crop gathering means becomes disengaged from the aperture 37 in the input chute to enable free movement of the crop gathering means to the longitudinal position B.

When the crop gathering means 17 is in the crop collecting mode the drive for the cutters, auger and beaters (if required) is effected from the drive 41 for the conveyor provided in the input chute 35 of the crop treatment means. This drive may be accomplished by means of a removable belt.

Figure 3:
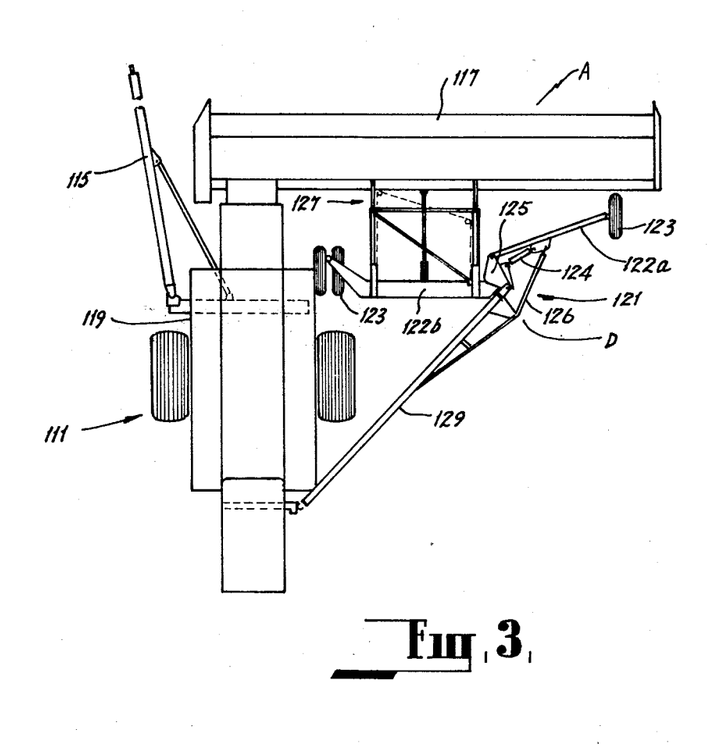
FIG. 3 is a top plan view of the second embodiment in the crop gathering mode.
Figure 4:
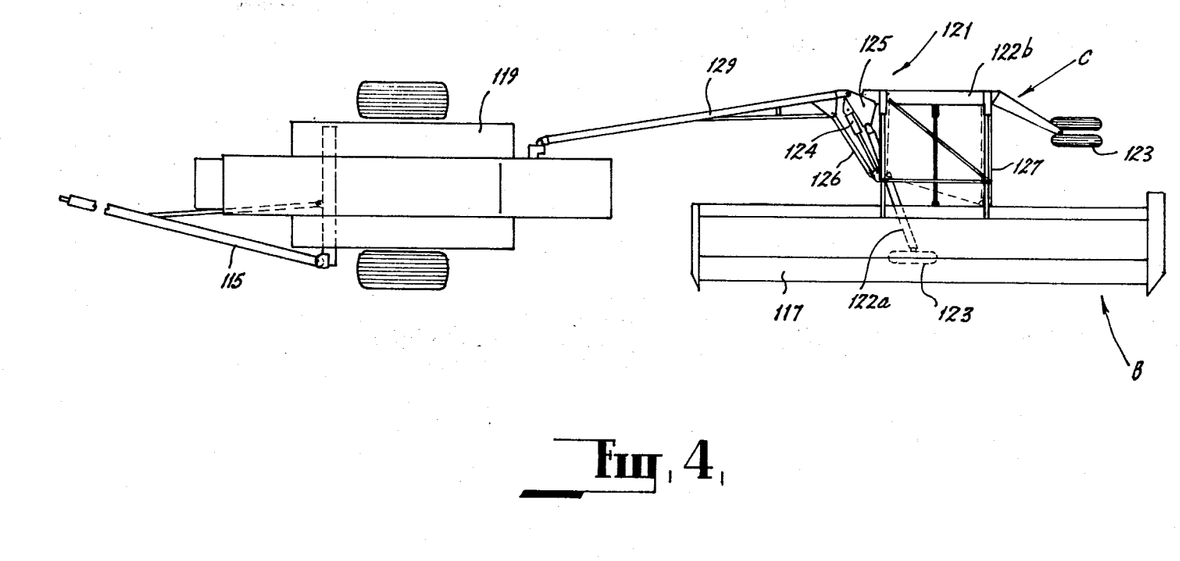
FIG. 4 is a top plan view of the second embodiment in the transport position.
Figure 5A:
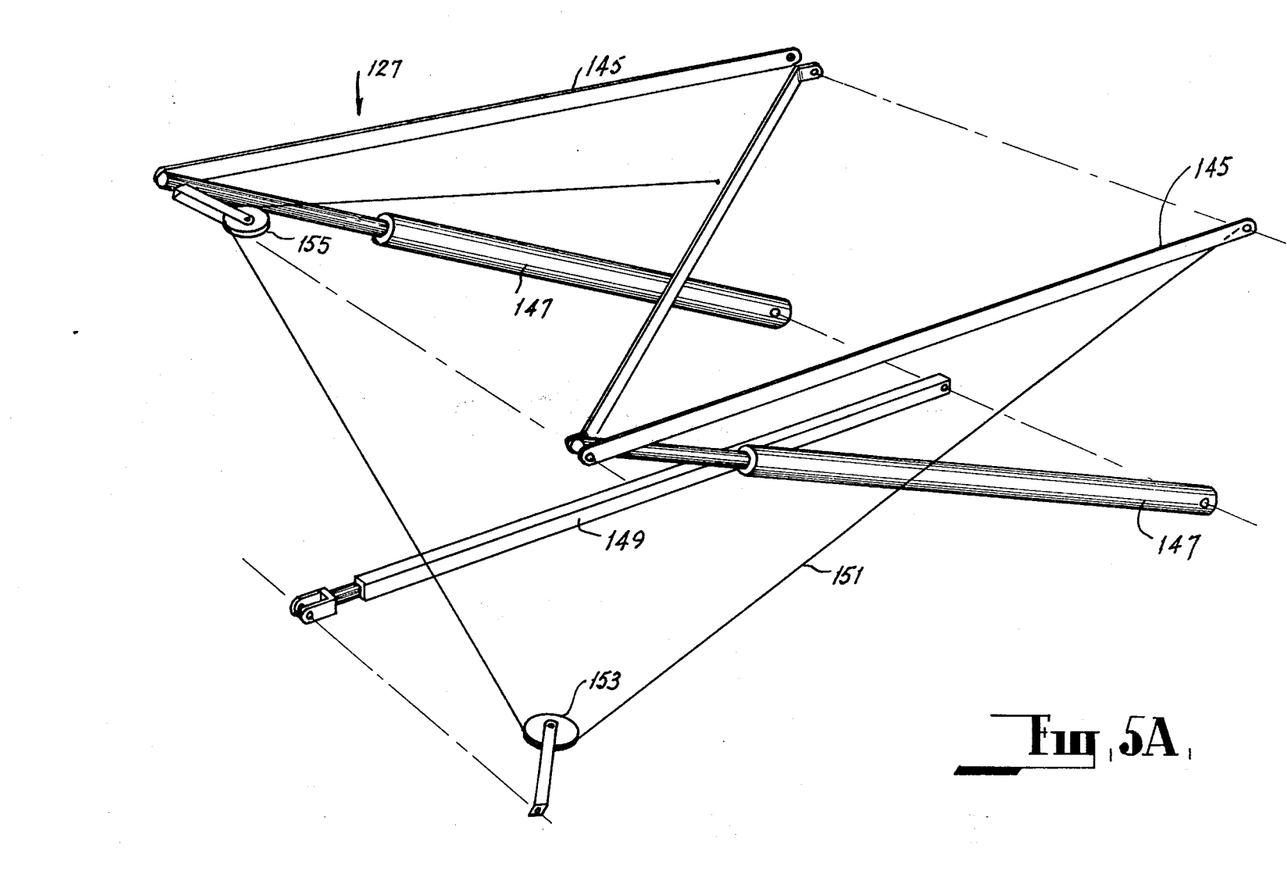
FIG. 5A is a perspective view of a support structure of the crop gathering means shown in FIG. 4 constructed in accordance with one embodiment of the invention.
Figure 5B:
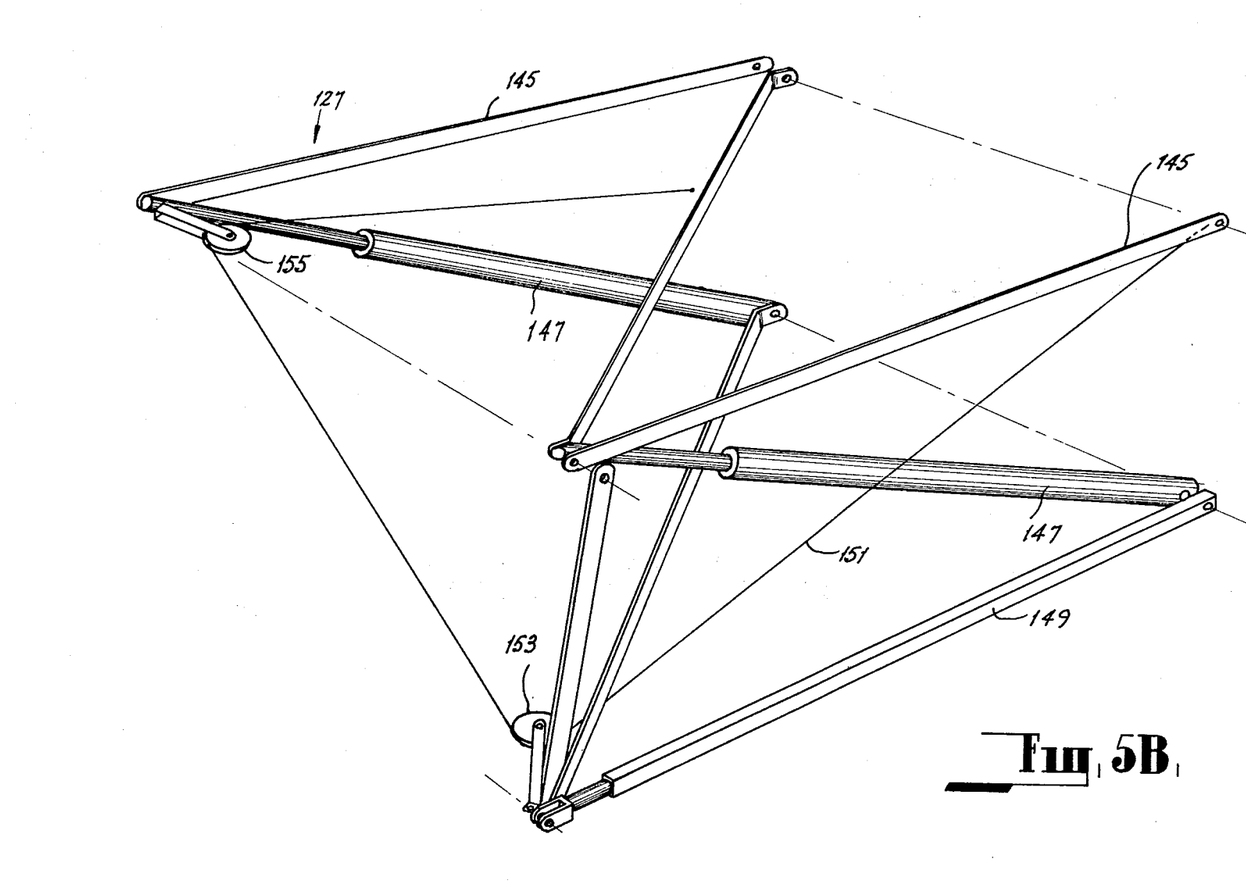
FIG. 5B is a perspective view, in part similar to FIG. 5A, and shows another embodiment of the support structure for the crop gathering means.

The second embodiment as shown at FIGS. 3, 4 and 5 is directed to a harvesting combine 111 which is to be trailed behind a tractor vehicle (not shown) via an articulated draw bar 115. As with the first embodiment the combine comprises a crop gathering means 117 and a crop treatment means 119. The crop gathering means 117 is supported by a first wheeled chassis 121 pivotally supported towards its centre about a substantially vertical axis whereby the crop gathering means 117 can be pivotal from a transverse position A on the first wheeled chassis 121 (see FIG. 3) to a second longitudinal position B on the first wheeled chassis 121 (see FIG. 4).

The first wheeled chassis 121 comprises a pair of wheels 123 each supported at the free end of a pair of arms 122a and 122b which are each mounted at their other end to a frame member 129 which is mounted at its other end to a rearward position of the chassis of the crop treatment means 119. One of the arms 122a supports a fixed wheel 123 and is positioned outermost when the first wheeled chassis 121 is in the crop collecting position and as shown at FIG. 3. The one arm 122a is pivotally mounted to a plate member 125 which is in turn pivotally mounted to the frame member 129. The pivotal movement of the one arm 122a is controlled by means of a hydraulic cylinder 124 mounted between the plate member 125 and the one arm 122a. The one arm 122a is retained in the position shown in FIG. 3 by means of a tie rod 126 which is detachably connected to the arm 122a and pivotally carried by the frame member 129.

The other arm 122b supports the wheels 123 via castoring arrangement and is rigidly fixed to the plate member 125. A supporting structure 127 on the one arm 122b supports the crop gathering means 117.

In moving the crop gathering means 117 to its longitudinal position B on the first wheeled chassis 121 the crop gathering means 117 is first raised by means of a pair of hydraulic cylinders 147 incorporated in the support structure (see either FIG. 5A or FIG. 5B). By means of the hydraulic cylinder 124 the one arm 122a is pivoted to a transverse position below the crop gathering means 117. In addition the wheel supporting end of the other arm 122b is disconnected from a detachable connection (not shown) with the crop treatment means 119 and on forward movement of the crop treatment means the frame member 129 moves to a trailing position behind the crop treatment means and the other arm 122b and the crop gathering means 117 also move into a longitudinal position C with respect of the crop treatment means 119. When in that position the tie rod 126 on the frame member is fixed to the supporting structure 127 to hold the crop gathering means 117 in a fixed position when in the transport position C.

The support structure 127 in accordance with a first embodiment as shown at FIG. 5A comprises a parallelogram linkage which consents of an upper planar frame 145 pivotally supported at one end to the other arm 122b (not shown in FIG. 5A) of the first wheeled chassis and at its other end to the crop gathering means 117 (not shown in FIG. 5A). A pair of hydraulic cylinders 147 are mounted between the other end of the frame 145 and the other arm 122b at a position spaced downwardly from the mounting of the one end of the frame 145 thereto. A tie bar 149 interconnects the one arm 122b and the crop gathering means 117 in parallel relationship underneath the frame 145. With extension of the hydraulic cylinders 147 the frame pivots upwards on the one arm 122b but due to the presence of the tie bar 149 the crop gathering means maintains a substantially constant attitude during such vertical movement.

In order to resist pivoting of the crop gathering means 117 on the one arm about a substantially transverse axis a cable 151 is associated with the support structure 127. The cable is mounted at one end adjacent the mounting of one member at one side of the frame 145 to the one arm 122b. The cable then passes around a pulley 153 mounted on a lower portion of the crop gathering means 117 (FIG. 5A) or the adjacent end of the lower tie bar 149 (FIG. 5B) and around another pulley 155 located on the upper portion of the crop gathering means but spaced longitudinally from the one pulley. The other end of the cable 151 is fixed to the one arm 122b at a point spaced below the point of attachment of the other side of the frame 145. The cable is maintained in a state of tension and serves to control any pivoting of the crop gathering means 117 about a transverse axis.

The tie bar 149 need not be fixed to the crop gathering means but need only support the lower portion of the crop gathering means. In such a case and in a case where the cable is fixed to the tie bar 149, a hydraulic ram may be mounted between the one arm 122b or lower link to cause the gathering means 117 to pivot on the upper frame 145 and thus change its attitude (FIG. 5B).

The interconnection of the outlet of the crop gathering means and the inlet of the crop treatment means takes the same form as that of the first embodiment and as shown at FIG. 2.

The combine of both embodiments has the advantage that the crop gathering means is supported by means of its own wheeled chassis thus removing from the structure of the crop treatment means any structural loading which would exist if the crop gathering means was supported from the crop treatment means in accordance with conventional practice. Such a feature not only eliminates from the crop treatment means the need for an auxiliary structure to support the crop gathering means but also means that the width of the crop gathering means can be extended from those conventionally in use. In addition the mounting of the crop gathering means to the first wheeled chassis at a point towards its centre, means that despite the increased width of cut of the combine the vertical movement of either end of the crop gathering means in relation to the ground as a result of undulations in the ground are not as severe as if the crop gathering means was supported at one end from the crop treatment means. A further advantageous feature of the embodiment resides in the articulated connection between the first wheeled chassis supporting the crop gathering means and the crop treatment means which enables the crop gathering means to be readily moved to a trailing position whereby it occupies a width no greater than that of the crop treatment means thus enabling transportation of the combine along highways, across paddocks and through gates.

It should be appreciated that the scope of the invention need not be limited to the particular scope of the embodiments described above or to the particular arrangement of components thereof.

The claims defining the invention are as follows:

1. A harvesting combine comprising a crop gathering means supported by a first wheeled chassis and a crop treatment means supported by a second wheeled chassis, said crop treatment means having a drawbar for connection to a tractor vehicle, the crop gathering means being pivotally supported on the first wheeled chassis for rotation about a substantially vertical axis between a first position lying transversely across the first wheeled chassis and a second position lying longitudinally thereon, said first wheeled chassis being pivotally mounted to the second wheeled chassis to be movable from a first position beside the crop treatment means to a second position trailing behind the crop treatment means, wherein when the first wheeled chassis is in its first position and the crop gathering means is in its first position on the first wheeled chassis the crop gathering means extends transversely in front of the crop treatment means and the outlet of the crop gathering means is in communication with the inlet of the crop treatment means, and when the first wheeled chassis is in its second position and the crop gathering means is in its second position both the first wheeled chassis and the crop gathering means are located behind the crop treatment means.

2. A harvesting combine as claimed at claim 1 wherein the first wheeled chassis is pivotally mounted to the rear of the second wheeled chassis.

3. A harvesting combine as claimed at claim 2 wherein the first wheeled chassis comprises an elongate frame member pivotally mounted at one end to the second wheeled chassis and supported contiguous to its other end by a pair of wheels, said crop gathering means being supported by its other end.

4. A harvesting combine as claimed at claim 3 wherein the crop gathering means is supported from the first wheeled chassis by a support structure including means for vertical movement of the crop gathering means with substantially no variation in the attitude of the crop gathering means.

5. A harvesting combine as claimed at claim 4 wherein the crop gathering means is pivotally mounted to the support structure for rotation about a substantially vertical axis.

6. A harvesting combine as claimed at claim 1 wherein the wheels of the first wheeled chassis are mounted such as to maintain a fixed attitude in relation to the first wheeled chassis.

7. A harvesting combine as claimed at claim 4 wherein each wheel is mounted to the elongate frame via an arm pivotally mounted to the elongate frame.

8. A harvesting combine as claimed at claim 7 wherein when the first wheeled chassis is in its first position one arm adjacent the crop treatment means supports its wheels via a castoring arrangement and the other arm supports its wheel in a fixed manner.

9. A harvesting combine as dependent on claim 8 wherein the one arm is rigidly mounted to an intermediate member which is pivotally mounted to the elongate frame member and the other arm is pivotally mounted on the intermediate member and includes a hydraulic cylinder operative between the intermediate member and the other arm for controlling the pivotal movement of said other arm.

10. A harvesting combine as claimed in claim 8 wherein the support structure is mounted to said one arm.

11. A harvesting combine as claimed at claim 10 wherein a tie rod is mounted between the elongate frame and the other arm when the crop gathering means is in the first position to maintain the axle of the fixed wheel substantially parallel with the crop gathering means and said tie rod is mounted between the elongate frame and the support structure when the crop gathering means is in its second position and when the crop gathering means is in its second position and the other arm lies transversely beneath the crop gathering means.

12. A harvesting combine as claimed at claim 4 wherein the support structure comprises a substantially planar frame pivotally mounted at one side to the first wheeled chassis about a substantially horizontal axis and pivotally mounted at the other side to the crop gathering means about a horizontal axis, a tie bar pivotally mounted between the first wheeled chassis and the crop gathering means in parallel relationship to the frame and spaced vertically from the frame and at least one hydraulic cylinder mounted diagonally between the first wheeled chassis and the crop gathering means.

13. A harvesting combine as claimed at claim 12 wherein the support structure further comprises a tensioned cable mounted at one end to the first wheeled chassis adjacent the mounting of the frame and at its other end to the first wheeled chassis at a point spaced vertically and horizontally from the one end, said cable passing over a pair of pulleys mounted to the crop gathering means, said pulleys being spaced vertically and horizontally from each other.

14. A harvesting combine as claimed at claim 1 wherein the inlet of the crop treatment means comprises a chute pivotally mounted to the crop treatment means about a substantially horizontal axis and sealingly receiving the outlet of the crop gathering means.

15. A harvesting combine as claimed at claim 14 wherein said inlet contains a conveyor and the drive of said conveyor is detachably connected with the drive of the crop gathering means.

16. A harvesting combine as claimed at claim 14 wherein when the crop gathering means is raised from its first position to its uppermost position the outlet becomes disengaged from the inlet.

* * * * *